(12) United States Patent
Bhandarkar et al.

(10) Patent No.: US 7,662,879 B2
(45) Date of Patent: Feb. 16, 2010

(54) COMPOSITIONS COMPRISING MODIFIED METAL OXIDES

(75) Inventors: Suhas Bhandarkar, Pleasanton, CA (US); Zhifeng Li, Arlington, MA (US); James A. Belmont, Acton, MA (US)

(73) Assignee: Cabot Corporation, Boston, MA (US)

( * ) Notice: Subject to any disclaimer, the term of this patent is extended or adjusted under 35 U.S.C. 154(b) by 546 days.

(21) Appl. No.: 11/639,027

(22) Filed: Dec. 14, 2006

(65) Prior Publication Data

US 2007/0208122 A1 Sep. 6, 2007

Related U.S. Application Data

(60) Provisional application No. 60/750,242, filed on Dec. 14, 2005.

(51) Int. Cl.
*C08K 3/20* (2006.01)
(52) U.S. Cl. ................. 524/430; 524/431; 524/432; 524/433
(58) Field of Classification Search ................. 524/430, 524/431, 432, 433
See application file for complete search history.

(56) References Cited

U.S. PATENT DOCUMENTS

| | | | | |
|---|---|---|---|---|
| 4,990,653 | A | * | 2/1991 | Hayakawa et al. .......... 560/221 |
| 5,683,628 | A | * | 11/1997 | Mizuno et al. .............. 252/586 |
| 7,037,583 | B2 | * | 5/2006 | Furman et al. .............. 428/403 |
| 7,491,440 | B2 | * | 2/2009 | Fukatani et al. ............. 428/328 |
| 2007/0060693 | A1 | * | 3/2007 | Ho .............................. 524/431 |

FOREIGN PATENT DOCUMENTS

JP 2000178450 * 6/2000

* cited by examiner

*Primary Examiner*—Bernard Lipman

(57) ABSTRACT

The present invention relates to polymerizable compositions comprising at least one monomer and at least one modified metal oxide comprising the reaction product of a metal oxide and at least one coupling agent. In addition, polymer compositions comprising a polymer and the modified metal oxide are also disclosed. Finally, methods for preparing the polymerizable compositions and polymer compositions are described as are optical devices comprising the polymer compositions.

35 Claims, 3 Drawing Sheets

I

II

III

IV

V

VI

COMPOSITIONS COMPRISING MODIFIED METAL OXIDES

CROSS-REFERENCE TO RELATED APPLICATIONS

This patent application claims the benefit of U.S. Provisional Patent application Ser. No. 60/750,242, filed Dec. 14, 2005.

BACKGROUND OF THE INVENTION

1. Field of the Invention

The present invention relates to polymerizable compositions comprising at least one monomer and at least one modified metal oxide as well as to polymer compositions prepared from these polymerizable compositions and methods of preparing them.

2. Description of the Related Art

Polymer compositions have been used to replace glass compositions in a variety of different applications, including optical devices such as lenses. The specific requirements of the application determine the type of polymer chosen. For example, in some applications, it may be desirable to provide a polymer composition having improved physical properties, such as mechanical strength, heat resistance, or toughness. In addition, processiblity, moldability, and cost may also need to be considered.

For optical devices, improved optical properties such as refractive index, transparency or clarity, and optical uniformity may also be important, and polymer compositions have these improved properties have been prepared. For example, U.S. Pat. No. 4,990,653 describes the preparation of a sulfur-containing oligomer composition which can be polymerized to form a cured product having a refractive index of 1.60 or higher along with excellent transparency and optical uniformity. In addition, U.S. Pat. No. 5,683,628 describes a photochromic resin composition comprising a specific class of di(meth)acrylate compounds which are described as having excellent heat resistance, mechanical strength, adhesion properties, moldability, and light resistance. These can be used, for example, as an antireflection film on a lens. The refractive index of the composition can be controlled by varying the amount of specific di(metha)acrylate compound and can be 1.54 or higher. However, with the ever-increasing demands for improved optical performance, along with the need for improved physical properties, processability and reduced cost, the use of these types of tailored polymers is limited.

Several types of metal oxides are known to have high refractive indexes. For example, in general, titanium dioxide (titania), zirconium oxide (zirconia), cerium oxide (ceria), zinc oxide, and barium titanate have a refractive index that is greater than or equal to about 1.7. However, metal oxides may be difficult to disperse well in a polymeric system, and poor dispersions typically have poor optical properties. In order to provide improved dispersibility in various matrices, including solvents and polymer systems, modified metal oxides have been prepared, and the type of modification used depends on the specific system. For example, silane coupling agents having functionality capable of reacting with silica and with a rubber matrix have been used to prepare modified silica particles for use in tire applications. Modifications to other metal oxides, including those with high refractive indexes, are also known. However, the modification made to the metal oxide would be expected to greatly decrease the material's refractive index, thereby reducing the effectiveness of the modified metal oxide for an optical application.

Thus, there is a need in the industry to provide polymer compositions for optical devices which have good overall performance, including mechanical properties and processability, along with improved optical properties, especially high refractive index.

SUMMARY OF THE INVENTION

The present invention relates to a polymerizable composition comprising at least one monomer and at least one modified metal oxide comprising the reaction product of a metal oxide and at least one coupling agent. In one embodiment, at least one coupling agent has a refractive index of greater than or equal to 1.48. Preferably the refractive index of the coupling agent is greater than or equal to 1.5, more preferably greater than or equal to 1.55, and most preferably greater than or equal to 1.6. In another embodiment, when polymerized, the polymerizable composition forms a polymer composition that is preferably transparent and has a refractive index of greater than or equal to 1.5. Preferably, the refractive index of the polymer composition is greater than or equal to 1.6, more preferably greater than or equal to 1.7, and most preferably greater than or equal to 1.8.

The present invention further relates to a polymer composition comprising a polymer and at least one modified metal oxide comprising the reaction product of a metal oxide and at least one coupling agent. In one embodiment, at least one coupling agent has a refractive index of greater than or equal to 1.48, preferably greater than or equal to 1.5, more preferably greater than or equal to 1.55, and most preferably greater than or equal to 1.6. In another embodiment, the polymer composition, which is preferably transparent, has a refractive index of greater than or equal to 1.5, preferably greater than or equal to 1.6, more preferably greater than or equal to 1.7, and most preferably greater than or equal to 1.8. The present invention also relates to optical devices comprising this polymer composition.

The present invention further relates to a method of preparing the polymer compositions described herein. The method comprises the step of combining a metal oxide and at least one coupling agent to form a modified metal oxide. In one embodiment, the method further comprises the step of combining at least one modified metal oxide with at least one monomer to form a polymerizable composition, and polymerizing the polymerizable composition to form the polymer composition. In another embodiment, the method further comprises the step of combining at least one modified metal oxide with at least one polymer.

It is to be understood that both the foregoing general description and the following detailed description are exemplary and explanatory only and are intended to provide further explanation of the present invention, as claimed.

DETAILED DESCRIPTION OF THE INVENTION

Figure 1:
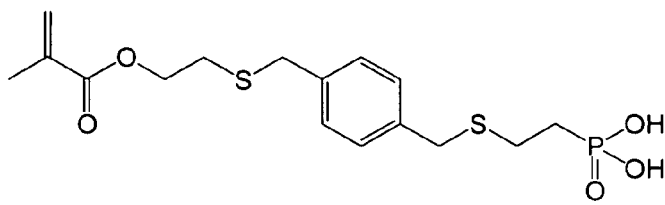
FIG. 1 shows representative coupling agents that can be used in the compositions and methods of the present invention.
Figure 1:
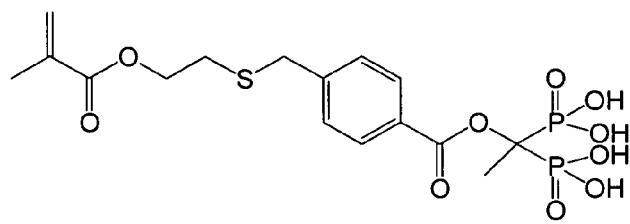
Figure 1:
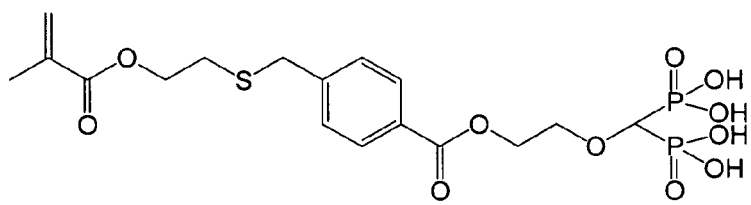
Figure 1:
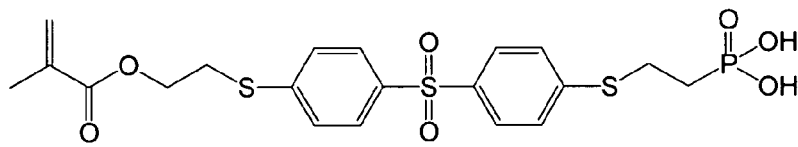
Figure 1:
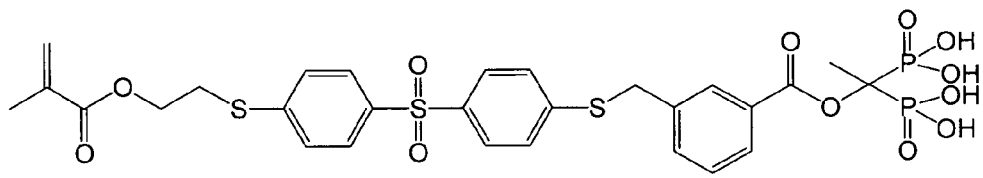
Figure 1:
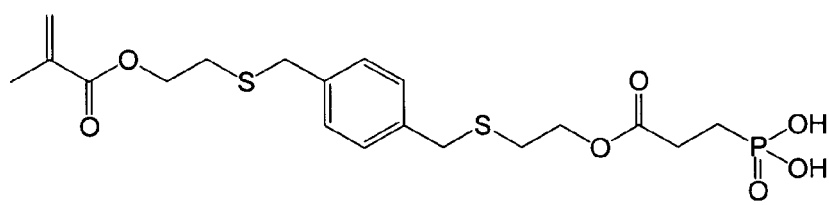

The present invention relates to polymerizable compositions and polymer compositions comprising modified metal oxides, as well as to methods for preparing these compositions and optical devices comprising them.

The polymerizable compositions of the present invention comprise at least one monomer and at least one modified metal oxide. The amounts of each component can vary depending on a variety of factors, including the type of monomer, metal oxide, or coupling agent as well as the intended application. For example, and as described in more detail below, the polymerizable compositions of the present invention may be used to prepare polymer compositions useful in optical devices and having improved optical properties, such as a high refractive index. If a monomer is chosen which, upon polymerization, produces a polymer having a refractive index that is lower than the refractive index of the modified metal oxide, or of the metal oxide or coupling agent which the modified metal oxide comprises, then the amount of monomer should be minimized in order to produce a high refractive index polymer composition. In general, the higher the refractive index of the monomer, the higher the amount that may be used. Further the higher the refractive index of the modified metal oxide, or of the metal oxide and/or coupling agent which the modified metal oxide comprises, the higher the amount of monomer that may be used (that is, less of the high refractive index modified metal oxide is needed to still produce a polymer composition having a high refractive index), in order to provide, for example, improved physical properties and reduced cost.

For the polymerizable composition of the present invention, the monomer may be present in any amount depending on a variety of factors, including the desired properties of the composition and/or the desired properties of the polymer composition prepared therefrom. For example, the amount of monomer may be between about 5% and 60% by weight, based on the total weight of the polymerizable composition. Preferably, the monomer is present in an amount of between about 5% and 40%, more preferably between about 5% and 20%, and most preferably between about 5% and 10% by weight, based on the total weight of the polymerizable composition. The modified metal oxide may be present in an amount greater than or equal to about 40% by weight, preferably greater than or equal to 60%, more preferably greater than or equal to 80%, and most preferably greater than or equal to 90% by weight, based on the total weight of the polymerizable composition.

The monomer used in the polymerizable composition of the present invention is an organic compound that is capable of forming a polymer under conditions known in the art. For example, the monomer may be any radically polymerizable monomer, including, for example, an ethylenically unsaturated monomer such as a substituted or unsubstituted alkyl acrylate or methacrylate monomer or a substituted or unsubstituted styrenic monomer. Others will be known to one skilled in the art.

The monomer may be one that is capable of forming a homopolymer or copolymer having a high refraction index, such as 1.5 or more. Examples include mono(meth)acrylate compounds having the formula $CH_2=C(R^1)-COOR^2$ wherein $R^1$ is a hydrogen or a methyl group and $R^2$ is a substituted or unsubstituted phenyl, benzyl or 2-phenoxyethyl group. Specific examples of mono(meth)acrylate compounds include phenyl (meth)acrylate, benzyl (meth)acrylate, 2-phenoxyethyl (meth)acrylate, 1,3,5-tribromophenyl (meth)acrylate and 2-(1',3',5'-tribromophenyl)-oxyethyl (meth)acrylate. The monomer may also be a di(meth)acrylate including, for example, 2,2'-bis[4-(methyl-acryloyloxy-ethoxy)phenyl]propane, and 2,2'-bis[(3,5-dibromo-4-methacryloyloxyethoxy)phenyl]-propane. Additional examples include various sulfur-containing diacrylate or dimethacrylate compounds, such as those having the formula $(CH_2=C(R^1)-COOR^3-S-R^4)_2-Ar$, wherein $R^1$ is a hydrogen or a methyl group, $R^3$ and $R^4$ are independently a C1-C12 alkylene group, and Ar is a substituted or unsubstituted arylene or heteroarylene group, such as a substituted or unsubstituted phenylene group. Examples include those described in U.S. Pat. Nos. 4,990,653 and 5,683,628.

The monomer may also be a mixture of polymerizable compounds. For example, the monomer may be a mixture comprising any of the specific monomers described above, along with at least one monomer which imparts additional optical or physical properties to the resulting polymer composition after polymerization. For example, the monomer may comprise at least one mono(meth)acrylate compound such as methyl(meth)acrylate, ethyl(meth)acrylate, n-propyl (meth)acrylate, isopropyl(meth)acrylate, n-butyl(meth)acrylate, isobutyl (meth)acrylate and t-butyl(meth)acrylate, cyclopentyl(meth)acrylate, cyclohexyl (meth)acrylate, methylcyclohexyl(meth)acrylate, trimethylcyclohexyl (meth) acrylate, norbornyl(meth)acrylate, isobornyl(meth)acrylate, adamantyl (meth)acrylate, dicyclopentanyl(meth)acrylate and dicyclopentenyl(meth)acrylate. In addition, di(meth) acrylate compounds as well as other crosslinkable monomer may also be included. Furthermore, polymerizable oligomeric compounds and/or small molecular weight polymers that can be further polymerized can also be used.

The modified metal oxide used in the polymerizable composition of the present invention comprises the reaction product of a metal oxide and a coupling agent. The amount of the metal oxide and the coupling agent that are combined to form the modified metal oxide can vary depending on a variety of factors, including for example, the type of metal oxide (such as particle size, surface area, and number and type of reactive groups) as well as the desired properties of the modified metal oxide. For example, the metal oxide and the coupling agent may be used in a weight ratio of between about 1:4 and 9:1 metal oxide to coupling agent. Preferably, the weight ratio of metal oxide to coupling agent is between about 1:1 and about 7:1, more preferably between about 1:1 and about 5:1, and most preferably between about 1:1 and about 3:1.

The metal oxide used to prepare the modified metal oxide may be any inorganic oxide known in the art. For example, the metal oxide may be titanium dioxide (titania), zirconium oxide (zirconia), cerium oxide (ceria), zinc oxide, or barium titanate. Preferably the metal oxide is titania and can be in either rutile or anatase form, but is preferably rutile (crystalline) titania. A particularly preferred metal oxide is one having a very small particle size when dispersed in water. For example, a 1% by weight aqueous dispersion of the metal oxide preferably has a particle size of between about 2 and about 15 nm, more preferably between about 5 and 10 nm. The particle size may be determined using any technique known in the art including, for example, dynamic light scattering. Furthermore, for applications of polymer compositions prepared from the polymerizable compositions of the present invention in which optical properties are important, which are described in more detail below, preferably the metal oxide has a refractive index that is greater than or equal to about 1.8, such as between about 1.9 and 2.9. Refractive index values, as used herein, are at room temperature and at sodium D-line (589 nm), unless otherwise indicated.

The coupling agent used to prepare the modified metal oxide can be any material capable reacting or interacting with both the metal oxide and either the polymerizable monomer, the polymer formed from the polymerizable monomer, or both. In this way, the coupling agent "couples" the metal oxide and the monomer or resulting polymer. Preferably the coupling agent comprises at least one group capable of reacting with the metal oxide, for example, by forming a covalent or ionic bond with the metal oxide surface. Examples include metal-containing groups, such as Si, Ti, Sn, or Se-containing groups, carboxylic acid groups, such as aryl or alkyl carboxylic acids, and phosphorous-containing groups, such as phosphonic acid groups or phosphonate groups. More preferably, the coupling agent further comprises at least one group capable of polymerizing with the monomer. The group capable of reacting or polymerizing with the monomer will vary depending on the type of monomer used. For example, if the monomer is a radically-polymerizable monomer, the coupling agent may also comprise at least one radically-polymerizable group, such as an acrylate or methacrylate group. Preferably, the coupling agent comprises at least one carboxylic acid group or at least one phosphonic acid group and at least one acrylate or methacrylate group.

In one embodiment of the present invention, at least one coupling agent has a refractive index of greater than or equal to 1.48. Preferably, the coupling agent has a refractive index of greater than or equal to 1.5, more preferably greater than or equal to 1.55, and most preferably greater than or equal to 1.6. Unlike conventional coupling agents, coupling agents having these refractive index values, in combination with a metal oxide, produce a modified metal oxide which has improved overall performance, particularly optical performance, in a polymerizable composition comprising at least one monomer as well as a polymer composition produced therefrom. Examples of coupling agents having these refractive index values include those that comprise at least one arylene or heteroarylene and either at least one sulfur-containing group, such as a thioether group or a sulfone group, or at least one halogen. Specific examples include compounds shown in FIG. 1. For comparison purposes, conventional coupling agents and their corresponding refractive index values (R.I.) are shown in Table 1 below.

TABLE 1

| Conventional Coupling Agent | R.I. | Temperature (° C.) |
|---|---|---|
| octyltriethoxy silane | 1.416 | 20 |
| octadecyl trimethoxy silane | 1.439 | 20 |
| hexadecyl triethoxy silane | 1.437 | 20 |
| decyl triethoxy silane | 1.422 | 20 |
| stearic Acid | 1.4299 | 80 |
| oleic Acid | 1.4449 | 60 |
| palmitic Acid | 1.4335 | 60 |
| glycolic acid-n-butyl ester | 1.427 | 20 |
| phenethyltrimethoxysilane | 1.4753 | 20 |
| ethylene glycol | 1.431 | 20 |
| polyethylene glycol | 1.459 | 20 |
| 3-aminopropyltriethoxysilane | 1.4225 | 20 |
| 3-glycidyl trimethoxy silane | 1.429 | 20 |
| 3-mercpatropropyl trimethoxy silane | 1.4502 | 25 |

In a second embodiment, the polymerizable composition of the present invention, when polymerized, forms a polymer composition having a refractive index greater than or equal to 1.5. Preferably, the refractive index of the polymer composition is greater than or equal to 1.6, more preferably greater than or equal to 1.7, and most preferably greater than or equal to 1.8. The coupling agent used to prepare the modified metal oxide may also have a high refractive index and can include any of those described in more detail above. Typically, high refractive index polymer compositions are prepared by controlling the composition of the polymer, particularly by use of monomers having specific structures. It has surprisingly been found that a polymer composition having a high refractive index value can also be produced from a composition comprising at least one modified metal oxide, wherein the modified metal oxide comprises the reaction product of a metal oxide and a coupling agent.

Thus, the present invention further relates to a polymer composition comprising a polymer and at least one modified metal oxide. The polymer compositions of the present invention may be prepared using any method known in the art. For example, the polymer compositions are prepared by polymerization of the polymerizable compositions of the present invention. Any method of polymerization known in the art can be used, and the choice will depend on the type of monomer present. Preferably, the polymer composition is prepared by polymerization of the polymerizable composition of the present invention comprising any of the monomers described above. The polymer composition may also be prepared by combining a preformed polymer and a modified metal oxide. Examples of preformed polymers include silicone polymers, such as a polysiloxane homopolymer or copolymer (including, for example, polyphenylmethylsiloxane), epoxies, polycarbonates, polyesters, and polyurethanes. The modified metal oxide comprises the reaction product of a metal oxide and at least one coupling agent and may be any of those described above. In one embodiment of the polymer composition of the present invention, the coupling agent has a refractive index greater than or equal to 1.48, preferably greater than or equal to 1.5, more preferably greater than or equal to 1.55, and most preferably greater than or equal to 1.6. In another embodiment the polymer composition, has a refractive index of greater than or equal to 1.5, preferably greater than or equal to 1.6, more preferably greater than or equal to 1.7, and most preferably greater than or equal to 1.8. For this embodiment, it is preferred that the coupling agent also has a high refractive index as described above.

The polymerizable composition of the present invention, as well as the polymer composition of the present invention, are also preferably transparent rather than opaque, turbid, or translucent. As used herein, a transparent material is one that allows a high level of light transmission (i.e., low light absorbance) across the visible range, 400-800 nm. The absorbance, A, of a material having a sample thickness, L, (path length, measured in cm) and a concentration of modified metal oxide, c (weight of modified metal oxide/weight of composition) can be determined by measuring the percent transmission (% T) at specific wavelengths and using Equation I:

$$A = \frac{\log(100/\%\ T)}{(L*c)} \quad (I)$$

The transparent compositions of the present invention preferably have i) an absorbance, A, 8, preferably 7, more preferably 6, and most preferably 5 at 400 nm; ii) an absorbance, A, 2, preferably 1.5, and more preferably 1 at 450 nm; and iii) an absorbance, A, 1, preferably 0.1, and more preferably 0.04 at 650 nm. It has surprisingly been found that a polymer composition having a high refractive index value can be produced from a composition comprising at least one modified metal oxide, and that such a composition can be transparent, having low absorbance (a high transmission) across a range of wavelengths, particularly in the blue.

The present invention further relates to a method of preparing the polymerizable compositions and the polymer compositions described above. Thus, the polymerizable compositions of the present invention may be prepared by a method comprising the step of combining at least one metal oxide and at least one coupling agent to form a modified metal oxide. The resulting modified metal oxide can then be combined with at least one monomer to form the polymerizable composition. Alternatively, the modified metal oxide may be prepared by combining, in any order, the metal oxide and a combination of the coupling agent and monomer. Other combinations are also possible. The polymerizable composition can then be polymerized to form the polymer composition of the present invention. Alternatively, the polymer composition may be prepared by combining the resulting modified metal oxide and at least one polymer, preferably as a dispersion, suspension, or solution. For both the method of preparing the polymerizable composition as well as the method of preparing the polymer composition of the present invention, the metal oxide, the coupling agent, and the monomer or polymer may be any of those described above.

When the polymerizable composition is prepared by combining a metal oxide and a coupling agent to form a modified metal oxide, each of these components can be in a variety of different forms. For example, the metal oxide may be in the form of a dispersion in a liquid vehicle. Preferably, the metal oxide is an aqueous dispersion—that is, the metal oxide is dispersed in a vehicle comprising greater than 50% by weight water. The metal oxide preferably has a very small particle size in the aqueous dispersion. For example, the metal oxide may be in an aqueous dispersion and may have a particle size of between about 2 and about 15 nm, and especially a particle size of between about 5 and about 10 nm.

The coupling agent may also be in the form of a dispersion or solution in a vehicle. Preferably, the coupling agent is a solution in a non-aqueous vehicle including, for example, various water immiscible solvents such as hydrocarbon solvent, ester solvents (including ethyl acetate), and aromatic solvents (including toluene, xylene, benzene and the like). Other water immiscible solvents can also be chosen, depending on the solubility characteristics and reactivity of the coupling agent. The non-aqueous solvent should be non-reactive with the coupling agent. Also, the water immiscible solvent may be the monomer used to form the polymerizable composition or may comprise the monomer.

The resulting modified metal oxide may also be in a variety of forms, including a solid form or a dispersion in any of the aqueous or non-aqueous vehicles described above. The form will typically depend on how it was prepared. For example, if the modified metal oxide is prepared by combining an aqueous dispersion of the metal oxide and a solution of the coupling agent in a water immiscible solvent, it has been found that the resulting modified metal oxide is a dispersion in the water immiscible solvent. If the coupling agent is a solution in the monomer (that is, the water immiscible solvent is the monomer), this results in a direct or in situ formation of the polymerizable composition.

Preferably, the particle size of the modified metal oxide in the non-aqueous dispersion is substantially similar to the particle size of the metal oxide in the aqueous dispersion used to prepare it. Preferred metal oxide particle sizes are described above. Thus, it is preferred that the modified metal oxide has a particle size of less than or equal to 50 nm in the dispersion, more preferably less than or equal to 25 nm, even more preferably less than or equal to 10 nm, and most preferably less than or equal to 5 nm. The modified metal oxide preferably also has a particle size of greater than or equal to 0.5 nm and more preferably greater than or equal to 1 nm.

The polymer compositions of the present invention can be used in a variety of different applications but have been found to be particularly useful where a high refractive index is desirable. For example, the polymer compositions may be used in various types of optical devices, including, for example, lenses, prisms, light emitting diodes, holographic data storage devices, photonic crystal devices, wave guides, reflectors, immersion materials, and the like. Thus, the present invention further relates to an optical device comprising any of the polymer compositions described above.

The present invention will be further clarified by the following examples which are intended to be only exemplary in nature.

EXAMPLES

Examples 1A and 1B

These examples describe the preparation of a polymerizable composition and polymer compositions of the present invention. The polymerizable composition comprises a monomer and a modified metal oxide, wherein, when polymerized, the polymerizable composition has a refractive index of greater than or equal to 1.5 and is transparent.

Modified $TiO_2$ having a small particle size was prepared using one of the following methods.

Method A

An aqueous acidic solution of $TiOCl_2$ (10 g, approximately 42% by weight, containing 15% by weight HCl) was heated to 90° C. This was then rapidly mixed with 240 g of deionized water that had been cooled to 4° C. Immediately, hydrolysis of the oxychloride resulted in formation of fine particles of $TiO_2$ as an approximately 1% by weight dispersion. These particles had a strong propensity to agglomerate and within a period of about 48 hours, were observed to form larger agglomerates measuring several 10's of nanometers in size (as measured by dynamic light scattering). However, after approximately 18 hours after preparation, it was observed that the resulting particles had an average particle size of about 8 nm and were narrowly dispersed (nominally ±5 nm).

Therefore, the 1% by weight aqueous dispersion of $TiO_2$ particles obtained after approximately 18 hours from $TiOCl_2$ hydrolysis described above was extracted with an equal volume of a water immiscible organic phase of toluene containing 1% by weight of Ethfac 161 (a phosphate ester of a 6-ethoxylated decanol, available from Ethox Chemicals). A modified metal oxide comprising the reaction product of the $TiO_2$ and the alkyl phosphate ester was produced, which was extracted into the water immiscible solvent layer. The final emulsion was allowed to stand and separate into two layers. The transparent organic layer containing approximately 0.3 to 1% by weight modified $TiO_2$ was then separated and concentrated to approximately 45 parts modified $TiO_2$ and 55 parts toluene by evaporating the organic phase. The resulting particle size of the modified metal of was nearly the same as the starting metal oxide (approximately 8 nm in the dispersion).

Method B

An aqueous solution of 50 g of acidic $TiOCl_2$ solution (42 weight % $TiOCl_2$, 15 weight % HCl) was heated to 85° C., held at this temperature for 90 minutes, and then slowly added to 200 g of a stirred 1 N NaOH solution which had been cooled to approximately 4° C. The solution became turbid (due to precipitation of hydrous titania) but then cleared up in about two hours after the addition of the acidic $TiOCl_2$ solution was completed. At this point approximately 20% of the $Ti^{4+}$ was converted to titania. The clear aqueous slurry was then extracted with an equal volume of toluene containing 1 weight % Ethfac 16, resulting in a dispersion that was essentially identical in concentration and appearance to that formed in Method A.

For Example 1A, the dispersion (100 parts) of the modified metal oxide in toluene was then combined with a methacrylate monomer which forms a homopolymer having a refractive index of 1.6, described in more detail in U.S. Pat. Nos. 4,990,653 and 5,683,628. The solvent was removed by evaporation, resulting in the formation of a dispersion of 45 parts of the modified metal oxide and 55 parts of the monomer. The resulting composition was surprisingly transparent.

The refractive index of the final concentrate would be expected to be a function of the refractive indexes of each of the individual components. Thus, since a methacrylate monomer (refractive index of approximately 1.6, since it forms a homopolymer having a refractive index greater than 1.6) was used with the modified metal oxide comprised approximately 15% by weight $TiO_2$ (refractive index of approximately 2.6, measured based on a previously prepared dispersion containing 17% of fine particle $TiO_2$ in toluene) and approximately 30% by weight of the alkylphosphonate ester (refractive index of 1.46), the final composite refractive index would be 1.59. It would be expected that, upon polymerization, the refractive index of the resulting polymer composition would be similarly high, and that the resulting polymer compositions could therefore be used in high refractive index applications requiring transparency, such as optical devices. Furthermore, as noted above, the polymerizable composition is transparent, and it would be expected that the resulting polymer composition would also be transparent. Finally, the refractive index could be increased if the content of the modified metal oxide were increased (the amount of the monomer decreased) or if a monomer having a higher refractive index was used.

For Example 1B, the dispersion (100 parts) of the modified metal oxide in toluene was combined with a phenylmethylsiloxane homopolymer (100-200 cSt, commercially available from Gelest, Inc., having a refractive index of 1.52). The solvent was removed by evaporation, resulting in the formation of a polymer composition comprising 70 parts of the modified metal oxide and 30 parts of the silicone homopolymer. The resulting composition, which would be expected to have a refractive index >1.5, based on the refractive index of the polymer and the amount of modified metal oxide, was also transparent, which indicates a good compatibility of modified metal oxide and silicone homopolymer. A higher refractive index could also be obtained by increasing the modified metal oxide loading in the polymer composition.

Figure 2:
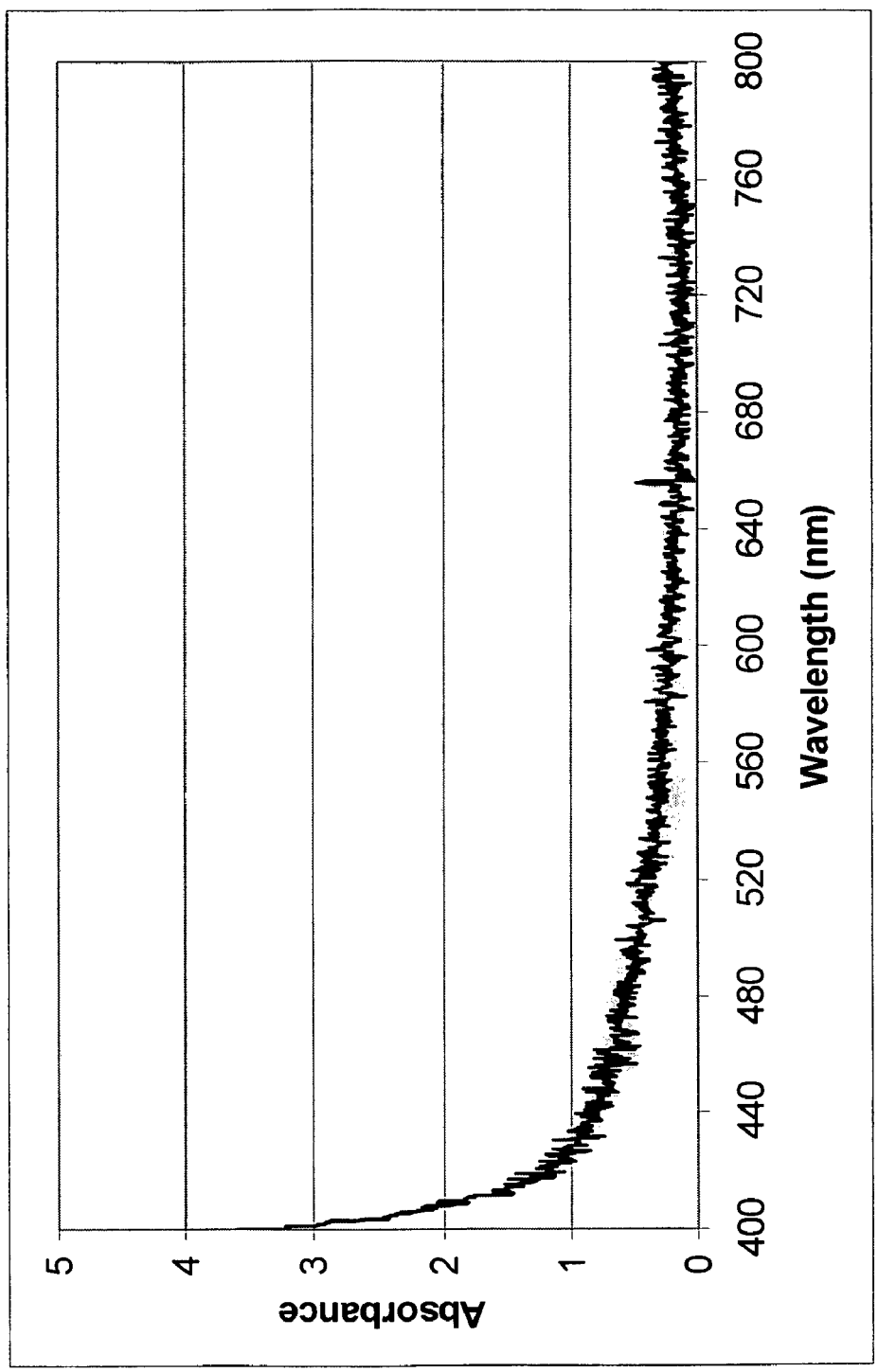
FIG. 2 and FIG. 3 show absorbance values of polymer compositions of the present invention across a range of wavelengths.
Figure 3:
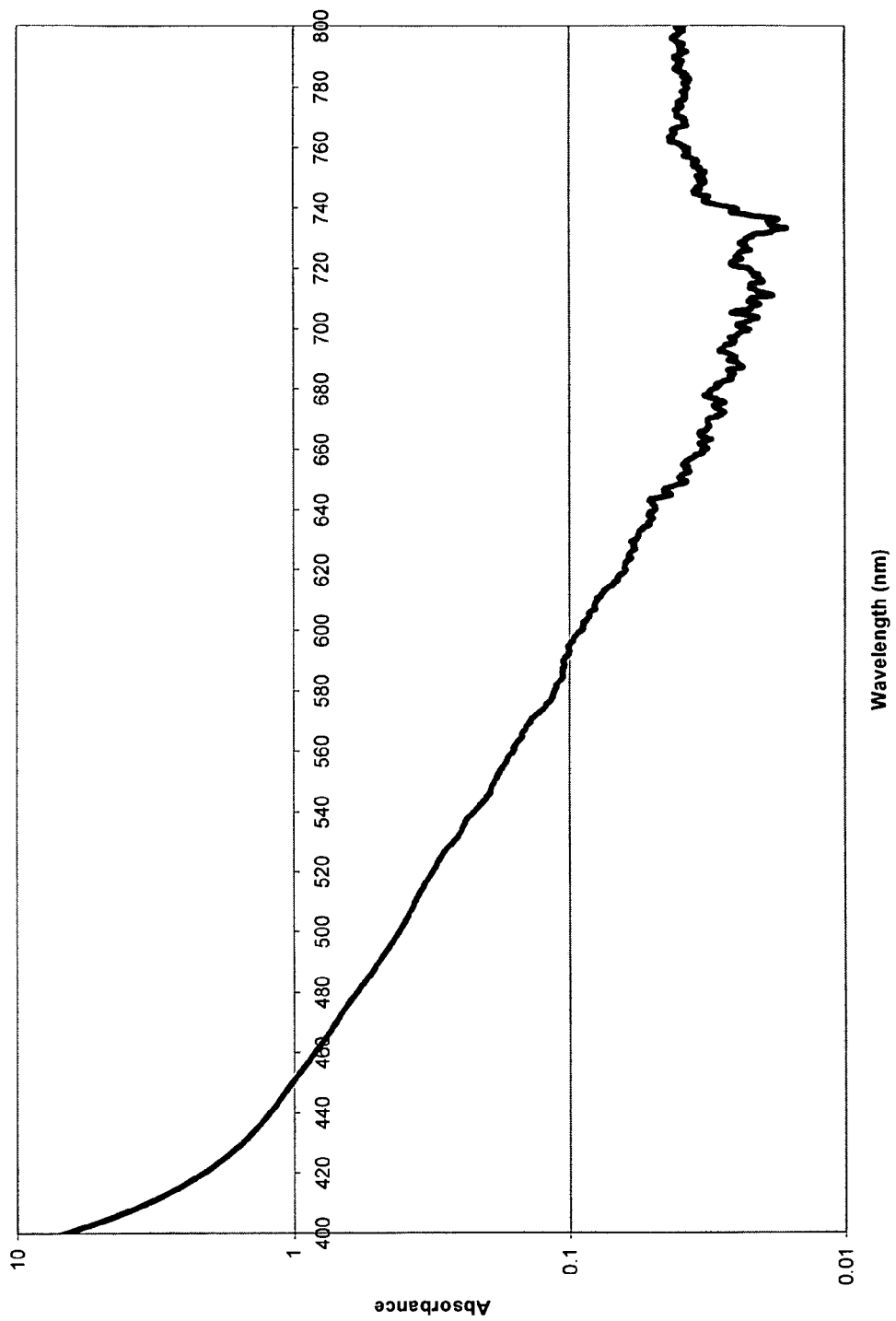

The absorbance values in the 400-800 nm wavelength range for the resulting transparent polymer composition (% transmission was measured on a 1 cm sample using a USB-ISS UV-Vis spectrometer, available from Ocean Optics, Inc.) is shown in Table 2 below. This data is also shown graphically FIG. 2 as well as in FIG. 3, which is a logarithmic plot to more clearly show the low absorbance values at the higher wavelengths. As the data shows, the polymer composition of the present invention had low absorbance (high transmission) across the 400-800 nm range and would therefore be considered transparent.

Examples 2-7

These examples describe the preparation of polymerizable compositions and polymer compositions of the present invention comprising a modified metal oxide, wherein the modified metal oxide comprises the reaction product of a metal oxide and a coupling agent having a refractive index of greater than or equal to 1.55.

TABLE 2

| lambda | % Transmission (% T) | Absorbance (A) |
|---|---|---|
| 400 | 56.83 | 3.27 |
| 405 | 66.73 | 2.34 |
| 410 | 72.59 | 1.86 |
| 420 | 81.27 | 1.20 |
| 430 | 84.44 | 0.98 |
| 440 | 87.09 | 0.80 |
| 450 | 89.22 | 0.66 |
| 460 | 87.22 | 0.79 |
| 470 | 89.86 | 0.62 |
| 480 | 89.22 | 0.66 |
| 490 | 91.78 | 0.50 |
| 500 | 92.87 | 0.43 |
| 510 | 92.48 | 0.45 |
| 530 | 93.82 | 0.37 |
| 550 | 94.37 | 0.34 |
| 560 | 95.19 | 0.29 |
| 570 | 94.48 | 0.33 |
| 590 | 94.68 | 0.32 |
| 600 | 95.33 | 0.28 |
| 620 | 97.28 | 0.16 |
| 630 | 97.00 | 0.18 |
| 640 | 97.37 | 0.15 |
| 650 | 97.69 | 0.14 |
| 660 | 97.30 | 0.16 |
| 680 | 96.86 | 0.18 |
| 690 | 96.98 | 0.18 |
| 695 | 99.02 | 0.06 |
| 700 | 99.19 | 0.05 |
| 710 | 99.52 | 0.03 |
| 720 | 98.47 | 0.09 |
| 740 | 98.40 | 0.09 |
| 750 | 99.52 | 0.03 |
| 770 | 98.33 | 0.10 |
| 790 | 98.50 | 0.09 |
| 800 | 98.85 | 0.07 |

For Example 2, a modified titania dispersion was prepared using the procedure described in Example 1A, with the exception that coupling agent IV shown in FIG. 1 was used as a solution in ethyl acetate (although toluene could also be used) in place of the alkylphosphate ester. The resulting modified metal oxide, comprising the reaction product of the metal oxide and the coupling agent, would be expected to have a very high refractive index since the refractive index of the coupling agent is 1.61. The polymer composition was prepared using the procedure described in Example 1B by combining the modified metal oxide dispersion and the homopolymer.

For Examples 3-7, the procedure described in Example 2 could be followed, with the exception that coupling agents I-III and V-VI shown in FIG. 1 are used in place of the alkylphosphate ester respectively. The resulting modified metal oxides comprising the reaction product of the metal oxide and the coupling agents would be expected to have very high refractive indexes since the refractive indexes of the coupling agents would be expected to be very high (greater than or equal to 1.60). The resulting polymerizable compositions of the present invention would be expected to form polymer compositions, upon polymerization, also having higher refractive indexes and would be transparent. These polymer compositions could therefore be used to prepare optical devices in which a high refractive index and high transparency are desirable.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention.

The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A polymerizable composition comprising
   a) at least one monomer and
   b) at least one modified metal oxide comprising the reaction product of a metal oxide and at least one coupling agent;
   wherein the at least one coupling agent has a refractive index of greater than or equal to 1.48.

2. The polymerizable composition of claim 1, wherein the monomer is present in an amount between about 5% and 60% by weight based on the total weight of the polymerizable composition.

3. The polymerizable composition of claim 1, wherein the monomer is present in an amount between about 5% and 40% by weight based on the total weight of the polymerizable composition.

4. The polymerizable composition of claim 1, where the monomer is present in an amount of between about 5% and 20% by weight based on the total weight of the polymerizable composition.

5. The polymerizable composition of claim 1, where the monomer is present in an amount of between about 5% and 10% by weight based on the total weight of the polymerizable composition.

6. The polymerizable composition of claim 1, wherein the metal oxide and the coupling agent are reacted in a weight ratio of between about 1:4 and about 9:1 metal oxide to coupling agent.

7. The polymerizable composition of claim 1, wherein the metal oxide and the coupling agent are reacted in a weight ratio of between about 1:1 and about 7:1 metal oxide to coupling agent.

8. The polymerizable composition of claim 1, wherein the metal oxide and the coupling agent are reacted in a weight ratio of between about 1:1 and about 5:1 metal oxide to coupling agent.

9. The polymerizable composition of claim 1, wherein the metal oxide and coupling agent are reacted in a weight ratio of between about 1:1 and about 3:1 metal oxide to coupling agent.

10. The polymerizable composition of claim 1, wherein the monomer is an acrylate or methacrylate monomer.

11. The polymerizable composition of claim 1, wherein the metal oxide has a refractive index of greater than or equal to 1.8.

12. The polymerizable composition of claim 1, wherein the metal oxide has a refractive index of between about 1.8 and 2.9.

13. The polymerizable composition of claim 1, wherein the metal oxide is titania.

14. The polymerizable composition of claim 1, wherein the metal oxide is rutile titania.

15. The polymerizable composition of claim 1, wherein a 1% by weight aqueous dispersion of the metal oxide has a particle size of between about 2 and about 15 nm.

16. The polymerizable composition of claim 1, wherein a 1% by weight aqueous dispersion of the metal oxide has a particle size of between about 5 and about 10 nm.

17. The polymerizable composition of claim 1, wherein the coupling agent has a refractive index of greater than or equal to 1.5.

18. The polymerizable composition of claim 1, wherein the coupling agent has a refractive index of greater than or equal to 1.55.

19. The polymerizable composition of claim 1, wherein the coupling agent has a refractive index of greater than or equal to 1.6.

20. The polymerizable composition of claim 1, wherein the coupling agent comprises at least one group capable of reacting with the metal oxide and at least one group capable of polymerizing with the monomer.

21. The polymerizable composition of claim 1, wherein the coupling agent comprises a) at least one arylene or heteroarylene group and b) at least one sulfur-containing group or at least one halogen.

22. The polymerizable composition of claim 20, wherein the group capable of reacting with the metal oxide comprises at least one metal-containing group, at least one carboxylic acid group, or at least one phosphorous-containing group.

23. The polymerizable composition of claim 22, wherein the metal-containing group comprises Si, Ti, Sn, or Se.

24. The polymerizable composition of claim 20, wherein the group capable of reacting with the metal oxide comprises at least one phosphonic acid group.

25. The polymerizable composition of claim 20, wherein the group capable of polymerizing with the monomer comprises at least one acrylate or methacrylate group.

26. A method for preparing a polymer composition comprising the steps of:
   i) combining a metal oxide and at least one coupling agent to form a modified metal oxide;
   ii) combining the at least one modified metal oxide with at least one monomer to form a polymerizable composition; and
   iii) polymerizing the polymerizable composition to form the polymer composition,
   wherein at least one coupling agent has a refractive index of greater than or equal to 1.5.

27. The method of claim 26, wherein the metal oxide is in an aqueous dispersion.

28. The method of claim 27, wherein the metal oxide has a particle size between about 2 and about 15 nm in the aqueous dispersion.

29. The method of claim 27, wherein the metal oxide has a particle size between about 5 and about 10 nm in the aqueous dispersion.

30. The method of claim 26, wherein the coupling agent is in a solution of a water immiscible solvent.

31. The method of claim 30, wherein the modified metal oxide is a dispersion in the water immiscible solvent.

32. The method of claim 31, wherein the modified metal oxide has a particle size of less than or equal to 50 nm in the dispersion.

33. The method of claim 31, wherein the modified metal oxide has a particle size of less than or equal to 25 nm in the dispersion.

34. The method of claim 31, wherein the modified metal oxide has a particle size of less than or equal to 10 nm in the dispersion.

35. The method of claim 31, wherein the modified metal oxide has a particle size of less than or equal to 5 nm in the dispersion.

* * * * *